United States Patent Office 3,793,414
Patented Feb. 19, 1974

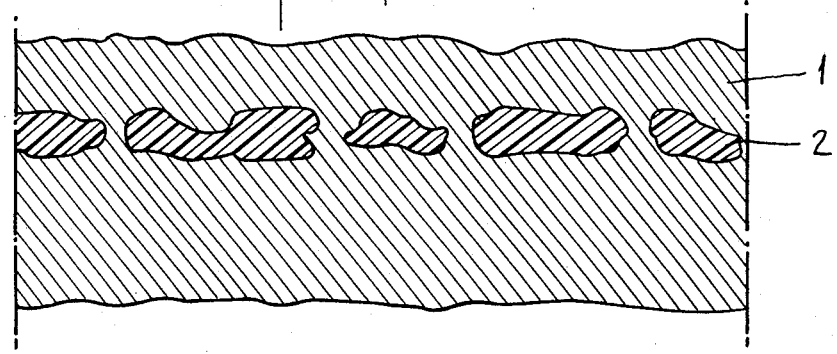
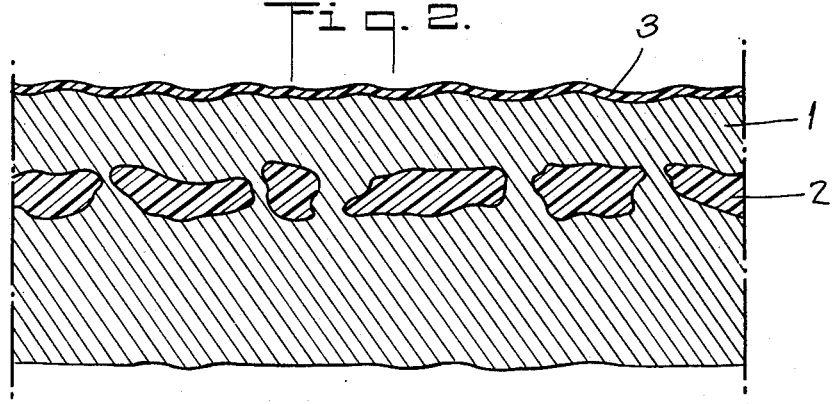

3,793,414
PROCESS OF PREPARING LEATHER SUBSTITUTE
FROM POLYURETHANE FOAM SHEET
Fred Buff, Paramus, Joseph Isadore Gross, Short Hills, and Lawrence William Healy, Glen Rock, N.J., assignors to Tenneco Chemicals, Inc., New York, N.Y.
Continuation of abandoned application Ser. No. 793,019, Jan. 22, 1969. This application Dec. 9, 1971, Ser. No. 206,563
The portion of the term of the patent subsequent to Nov. 11, 1986, has been disclaimed
Int. Cl. B29d 27/00; B29h 7/20; B32b 5/28
U.S. Cl. 264—48                                                5 Claims

ABSTRACT OF THE DISCLOSURE

Leather substitute composition comprising a fibrous mat adjacent a polyurethane foam sheet with a number of the fibers of the mat penetrating the foam sheet and a thin, flexible polymer coating on the foam side of the composition.

This is a continuation of application Ser. No. 793,019 filed on Jan. 22, 1969, now abandoned.

This invention relates to novel supple sheet compositions and to the process for making the same.

Natural leather has found wide use in decorative and functional products because of its desirable qualities such as appearance, strength, ability to absorb or transmit moisture vapor, suppleness, etc. However, a number of problems are associated with leather products. Leather is a natural product and therefore exhibits wide variations in quality, size, etc. It also does not possess a desirably high resistance to chemical and biological attack, as well as mechanical deterioration, e.g., by abrasion, flexing, etc. In order to avoid these drawbacks of natural leather, it has been proposed to produce synthetic, supple sheet compositions to replace leather in such areas as shoes, clothing, pocketbooks, upholstery, industrial belting, sporting goods, decorative items, etc.

Supple sheet compositions such as those intended for use as leather substitutes have previously been prepared in a variety of ways, but none of the processes or products heretofore disclosed has proved completely satisfactory. The products obtained have not closely duplicated all of the desirable qualities of leather such as hand, break, temper, accommodation to bending and compression, the water vapor transmission and absorption, heat transmission and set required for comfort and appearance in shoes, or have not possessed the strength, durability and environmental resistance required for long wear.

Moreover, the processes proposed have been difficult or inconvenient, requiring precise control of humidity or other process conditions. Accordingly, no relatively inexpensive, completely satisfactory technique for preparing such supple sheet compositions has been described.

It is an object of this invention to provide novel supple sheet compositions and processes for making the same. It is a further object to provide novel leather substitutes.

The novel compositions of this invention comprise a flexible, compressed cellular polyurethane sheet, a fibrous mat adjacent to at least one side of said sheet, a plurality of the fibers in said fibrous mat penetrating said sheet, and a coating of flexible polymer on the side of said sheet opposite to said fibrous mat, said coating of flexible polymer having a thickness substantially less than the thickness of said flexible, compressed cellular polyurethane sheet.

In the drawings FIG. 1 is a cross-sectional view of a fiber-foam substrate of this invention;

FIG. 2 is a crosss-ectional view of a fiber-foam substrate of the invention with a polymer coating.

In the figures, 1 is the fibrous mat, 2 is the polyurethane sheet with certain of the fibers penetrating therethrough, and 3 is the polymeric coating.

In accordance with this invention, the novel compositions are preferably prepared by the process which comprises the steps of preforming a flexible, uncompressed cellular polyurethane sheet; placing a fibrous mat into said sheet thereby forming an integrated fiber-foam substrate; compressing said fiber-foam substrate at a temperature and pressure sufficient to produce a permanently compressed fiber-foam substrate; and applying to the said sheet opposite to said fibrous mat a coating of flexible polymer, the thickness of said coating of flexible polymer being substantially less than the thickness of said compressed fiber-foam substrate.

Flexible cellular polyurethanes as the term is commonly used in the art, are foams which give an ultimate elongation of at least about 100% at room temperature and have the ability to deform readily under load. Typical useful foams are those requiring a compression of about 3–100 pounds per 50 square inches to produce a 25% deflection, measurements being made on a two inch thick sample at 25° C. in accordance with ASTM test number 1564–59T for indent load deflection. The foam sheet will preferably have a tensile strength of between about 5 and 35 p.s.i., an ultimate elongation between about 100 and 400% and a tear strength of about 0.6 to 5 pounds per inch. The preferred foams will also have between about 25 and 100 cells per linear inch and a density of the order of about 0.8 to 6 pounds per cubic foot.

The flexible cellular polyurethane employed in the practice of this invention is prepared by the reaction of an organic polyisocyanate with an organic compound having at least two isocyanate-reactive hydrogen atoms. Preferably, the organic compounds having at least two reactive hydrogen atoms will have a molecular weight of at least 200. It can be a polyalkylene polyether prepared by polymerizing an alkylene glycol or alkylene oxide. The useful polyethers include polyethylene glycol, polypropylene glycol, polytetramethylene glycol, copolymers of glycols with triols such as 1,2,6-hexanetriol or trimethylol propane, copolymers of two or more oxides, such as ethylene oxide-propylene oxide copolymers, etc. It can also be a polyester such as those prepared by reacting ethylene glycol, propylene glycol, tetramethylene glycol, hexanetriol, propylene glycol, tetramethylene glycol, hexanetriol, trimethylol propane and polymers thereof with dicarboxylic acids such as those derived from castor oil, tall oil fatty acids, and othr fatty acids, or dicarboxylic acids such as adipic acid, succinic acid, maleic acid, phthalic acid, etc.

Useful organic polyisocyanates include arylene diisocyanates or triisocyanates, typically tolylene diisocyanate, phenylene diisocyanate, tolylene triisocyanate, benzidine diisocyanate, mesitylene diisocyanate, arylene diisocyanate, naphthalene diisocyanate, etc.; aliphatic polyisocyanates, typically hexamethylene diisocyanate, 4,4'-methylene bis(cyclohexyl isocyanate), decamethylene diisocyanate, etc. The preferred polyisocyanates are the arylene diisocyanates and particularly the commercially available 80–20 mixture of 2,4- and 2,6-tolylene diisocyanate.

The cellular polyurethanes are prepared by reacting an organic polyisocyanate, typically tolylene diisocyanate with the organic compound having reactive hydrogen atoms in the presence of a gas-producing agent. The gas-producing agent may be water, which reacts with the isocyanate to form carbon dioxide, or it may be an inert volatile liquid or a gas. Additional components such as cell-modifiers, emulsifiers, dyes, etc. may also be present.

The preferred cellular polyurethanes are flexible cellular polyether or polyester ureathanes having a density between about 0.8 and 6 pounds per cubic foot. They may have an open-cell or closed-cell structure, but open cells are preferred. The term "open-cell" means that at least about 90% of the cells are interconnecting and free of cell-separating membranes. Open-cell cellular polyurethanes can be prepared by suitable foaming techniques or by chemically, mechanically or explosively opening the cells of a closed cell foam.

After the foam is prepared, generally in the form of a bun, it is formed into sheets suitable for use in this invention by any suitable technique such as slicing, splitting or peeling the bun. Sheet thicknesses between about 1/8 inch and about 2 inches are most suitable and thicknesses of about 3/8 inch to about 1 inch are preferred. According to certain embodiments of the invention, the cellular polyurethane sheet employed may be made up of two or more individual layers. In such cases, the total thickness of all of the layers is between about 1/8 inch and 2 inches, each individual layer having a thickness as low as about 1/16 inch or lower.

The novel fiber-foam substrates of this invention are prepared by placing a fibrous mat on at least one side of the cellular polyurethanes sheet and physically forcing a plurality of the fibers through the sheet. The fibrous mat employed may be any woven or non-woven mat in which individual fibers have sufficient freedom of movement so that they can be forced into the foam to achieve the desired degree of penetration. Nonwoven mats of comparatively loose construction are favored. Such mats include loosely knitted yarn structures, webs produced by carding or air-laying, etc. Fabrics having a density between about 3 ounces per square yard and 24 ounces per square yard are generally suitable. The presently preferred fibrous mats are cross-laid, non-woven webs having a density of about 3-9 ounces per square yard. The mats may be unbonded or bonded webs, such as those bonded with a flexible adhesive or by thermoplastic fibers, solvent-bonded, salt-bonded or bonded by other conventional techniques.

The fibrous mat may be made from any common, natural or synthetic fiber such as polyesters, acrylics, polyamides, modacrylic, vinyls, cellulosics, wool, silk, etc. The preferred fibers are organic fibers, most preferably synthetic organic fibers. They can be polyamides, such as polyhexamethylene adipamide (nylon 66) or polycaproamide (nylon 6); polyesters, such as polyethylene terephthalate or polydimethylcyclohexyl terephthalate; acrylics such as polyacrylonitrile; vinyls, such as polyvinyl chloride or polyvinyl alcohol; cellulosics such as rayon, etc. Mixtures of two or more fiber types may be employed.

As used herein, the term "fiber" includes tow, staple, continuous filament and similar fiber forms. The fibers may be present as yarns. They may be crimped (whether or not heat-set) or uncrimped. The fibers employed will generally have a denier between about 0.5 and 6 and preferably less than about 3. Fiber denier and fabric density are related in preferred embodiments. At lower fabric densities, say 3-6 ounces per square yard, it is preferred to use lower fiber deniers, say 0.5-3, to provide a sufficient number of individual fibers. Fibers of higher denier, e.g. 3-6 are more suitably employed in fabrics of higher density, e.g., 6-24 ounces per square yard. Products having an optimum balance of properties are obtained when the fabric density and fiber denier are also related to the thickness of the cellular polyurethane sheet. Sheets in the lower end of the useful range of thicknesses are preferably combined with fibrous mats having a lower fabric density and a lower fiber denier. For example, cellular sheets of about 1/8 inch to 3/8 inch thickness are preferably combined with fibrous mats having a density of about 3 to 6 ounces per square yard and a fiber denier of about 0.5 to 3.

The individual fibers should have a length at least sufficient to permit the desired degree of penetration of the cellular polyurethane sheet in its uncompressed state. Fiber lengths of at least about 1/2 inch are desirable. Fibers in conventional textile lengths are generally suitable for use in this invention.

It is a particular feature of this invention that products corresponding to different types of natural leather can be prepared by altering the composition of the fibrous mat. The mat may comprise fibers of two or more chemical types, lengths, denier, degree of crimp, etc. Blends of two or more fibers can be made in a single fibrous mat or different fibrous mats can be combined.

The fibrous mat is physically placed on the cellular polyurethane sheet and a plurality of fibers are physically forced into the sheet. The degree of penetration of the fibers will be sufficient to bind the fibrous mat and cellular polyurethane sheet into an integrated unit which, after compression as hereinafter described, will have a leather-like hand and accommodation. The degree of penetration required to do this will vary with the thickness of the polyurethane sheet. Sufficient penetration will generally be achieved if at least 50% of the penetration fibers penetrate to at least about 50% of the sheet thickness and at least some of the penetrating fibers penetrate to at least about 75% of the sheet thickness. In all cases it is preferred that at least some of the fibers which are forced into the sheet will penetrate the sheet completely and will be flush with or protrude from the opposite side. Most preferably, at least 50% of the penetrating fibers will completely penetrate the sheet.

In preferred embodiments of the invention the fibers which completely penetrate the sheet will be bound by the coating of flexible polymer on the opposite side of the sheet. Fibers which do not protrude are held in the integrated fiber-form substrate by physical entanglement with those which do.

Any suitable technique for forcing the fibers through the foam may be employed. The preferred method is needling the fibers into the foam by passing a needle through the fibrous mat and thereafter into the cellular polyurethane sheet. Needling is convenient, rapid, and minimizes are physical damage to the foam. Conventional needling devices such as needle looms can be used. Preferably, the needles used will be relatively fine needles having a number of barbs which snag the fibers and force them through the foam.

In order to obtain the desired integrated structure, it is desirable to needle the fiber into the foam at a penetration density of at least about 500 penetrations per square inch. Preferably, the total penetration density will be between about 1000 and 5000 penetrations per square inch. Above about 5000 penetrations per square inch, the physical properties of the cellular polyurethane sheet may be undesirably affected. Penetration densities in the upper end of this range are preferably employed with the thicker cellular sheets and lower penetration densities are preferably employed with thinner cellular sheets.

In accordance with certain embodiments of this invention, the cellular polyurethane sheet may be composed of two separate layers and the fibrous mat may be forced into the two layers in two consecutive steps. For example, the fibrous mat can be placed on a first layer of cellular polyurethane and needled, and this needled composite structure can be placed on a second layer of cellular polyurethane and again needled. When this embodiment is practiced, each layer of cellular polyurethane preferably has a thickness of about 1/16 inch to about 1 inch, the total thickness of both layers together being between about 1/8 inch and 2 inches. Preferably, the first layer may be thicker than the second layer. For example, the first layer may have a thickness of about 3/8 inch and the second layer may have a thickness of about 1/4 inch.

The needling of the two-layer cellular polyurethane sheets is preferably carried out in two separate steps. The fibrous mat is placed on the first layer and needled to a penetration density of at least about 500 penetrations per square inch, say 1000–3000 penetrations per square inch.

The composite structure which is formed is then placed on the second layer of cellular polyurethane and needled again to a penetration density of at least 500 penetrations per square inch, say 1000–3000 penetrations per square inch. Preferably the total number of penetrations for the first and second layers will be about 2000–5000 penetrations per square inch.

The degree to which the fibers penetrate the cellular polyurethane sheet is determined by the configuration of the needles employed, the depth of needling, the fiber length and the thickness of the cellular polyurethane sheet. In preferred embodiments wherein at least some of the penetrating fibers completely penetrate the cellular sheet, they will preferably be flush with or protrude less than about ¼ inch from the surface of the sheet.

The integrated fiber-foam substrate formed by physically forcing fibers from the fibrous mat into the cellular polyurethane sheet is compressed at a temperature, pressure and time sufficient to give a permanently compressed fiber-foam substrate. The term "permanently compressed" as used herein means that the compressed substrate will remain in a compressed state after the heat and pressure are removed. Compression devices such as nip rollers, rotary presses, platen presses or the like, may be used. The precise compression parameters chosen will depend upon the nature and properties of the particular cellular polyurethane and fibers chosen and, to a large extent, on the particular equipment used. The temperature employed should be sufficiently high to permit permanent compression of the fiber-foam substrate under the pressure and time employed but not high enough to cause thermal decomposition of the polyurethane or the fiber. The temperature should be lower than the temperature at which the fiber or the polyurethane flows at the pressure and time employed so that the fibers are not substantially deformed and the cellular structure of the polyurethane is not lost. Temperatures which are too low will not give the desired permanent compression of the substrate. Temperatures which are too high will cause decomposition of the substrate or loss of its fiber or cellular qualities. Although the choice of the temperature used is dependent upon a consideration of the entire system, it will generally be in the range of about 275–375° F.

The pressure employed will be sufficient to produce permanent compression of the substrate under the conditions employed and insufficient to destroy the cellular structure of the polyurethane. Preferably, the substrate will be permanently compressed to a thickness of between about 0.02 and 0.1 inch which will generally correspond to about 5–60% of its original thickness, i.e. its thickness after needling. The compressed fiber-foam substrate will typically have a density of about 15 to 100 pounds per cubic foot. The pressure required to produce permanently compressed fiber-foam substrates having the desired density, thickness and percent compression may vary depending upon the system employed. For flat-bed presses, pressures of about 100 to 400 p.s.i. are suitable and pressures of about 250 to 325 p.s.i. are preferred. Equivalent conditions will be employed with other equipment.

The length of time for which the fiber-foam substrate will be compressed will be sufficient to produce the desired degree of permanent compression and physical properties. Compression times of at least about 2 minutes are generally satisfactory with flat-bed presses. Substantially shorter compression times may not produce permanent compression. Compression times which are too long may result in loss of the desired structure. Typically, satisfactory products are produced by compression time in the range of 2 to 15 minutes in a flat-bed press. Where other equipment is used, the time of compression will be varied to produce equivalent compression conditions. For example, equivalent compression times for a rotary press are generally found to be somewhat lower than those utilized with a flat-bed press.

The product obtained after compression is a supple, permanently compressed, integated fiber-foam substrate, typically having a thickness of about 0.02 to 0.1 inches and a density of about 15 to 100 pounds per cubic foot. The composition of the compressed fiber-foam substrate will depend upon the original thickness and density of the original cellular polyurethane sheet and the thickness and weight of the original fibrous mat. Typically, the fiber-foam substrate may comprise about 10 to 80% by weight fibers and about 20 to 90% by weight polyurethane.

Because of its integrated, compressed structure, the compressed fiber-foam substrate exhibits a unique combination of fiber-like and foam-like qualities. This unique combination of properties gives the substrate physical properties which very closely approximate the drape, flexibility and hand of natural leathers. By proper choice of fibrous mat and cellular polyurethane sheet, it is possible to duplicate the properties of virtually any type of leather. The preferred novel compressed fiber-foam substrates also have the desired quality of breathability, i.e. they are substantially impermeable to liquids but are either permeable to moisture vapor and/or have the ability to absorb it during use and subsequently release it.

The novel compositions of this invention will have a coating of flexible polymer on the side of the cellular polyurethane sheet opposite to the fibrous mat, and preferably there will be a plurality of fibers which completely penetrate the cellular sheet and are bound by the flexible polymer coating. The flexible polymer coating serves as a basis for finish coatings which are applied to enhance the serviceability or aesthetic properties of the finished sheet material. If desired, the flexible polymer coating may itself be the desired finish coating.

The flexible polymer coating may be applied to the surface of the cellular polyurethane sheet before the needling operation, after needling but before compressing, or after compressing. Where the flexible polymer coating also serves as the finish coating, it may be applied before compressing and the compressing operation may be used to impart a textured or embossed pattern in the coating. Preferably, the flexible coating is applied to the cellular polyurethane sheet prior to the needling operation and preferably it will be distinct from the finish coating. The flexible polymer may be applied to the foam in the form of a solution, an aqueous or non-aqueous dispersion, a plastisol, organosol, with or without a vehicle (i.e. in a 100% nonvolatile form), etc. Preferably, it will be applied in a comparatively viscous state, e.g. about 2000 cps. or higher, so that it does not penetrate too deeply into the foam.

Application of the flexible polymer coating may be by any suitable technique such as curtain coating, spraying, cobweb spraying, roller-coating, knife-coating, casting, extruding, release-paper coating, calendering, etc. It may be applied as a paste, a viscous solution or dispersion, etc. Preferably it is applied in a viscous form no that it does not penetrate the interior of the cellular polyurethane sheet to any substantial degree. It may be cured after applying, if necessary.

The total thickness of the coating, including the finish coating, is preferably substantially less than the thickness of the compressed fiber-foam substrate. This is desirable to prevent any substantial masking or alteration of the leather-like hand and drape of the substrate. Generally, the total coating thickness will be about 0.001 to 0.015 inch and preferably about 0.004 to 0.009 inch in the finished product. Preferably, the total final coating will have breathability.

The flexible polymer coating may comprise any flexible polymeric composition which is sufficiently flexible and elastic to be compatible with the substrate. The principal purposes of the coating are to provide a finishable surface and, in preferred embodiments, to bind the fibers which protrude from the surface of the foam. Preferably, the flexible polymer coating will have a tensile strength and ultimate elongation which is at least as great as the fiber-foam substrate. It will also desirably possess the ability to form a strong bond with the substrate. Preferably, it will have a high degree of toughness and abrasion resistance.

The flexible polymer may be a polyurethane, a polyacrylate, a vinyl polymer such as polyvinyl chloride and polyvinylidene chloride, a polyester, a polyamide, an epoxy, etc. Preferably the flexible polymer will be a flexible polyurethane elastomer, as these materials generally possess the most desirable physical properties, notably abrasion resistance. Polyurethane elastomers are prepared by the reaction of organic polyisocyanates with compounds having at least two isocyanate-reactive hydrogen atoms. The isocyanates used include those hereinbefore described.

The organic compound having at least two isocyanate-reactive hydrogen atoms can be a polyether, a polyester, a polyamine, a polyethioether, etc. or mixtures thereof. The preferred compounds are the polyalkylene polyethers and polyesters hereinbefore described.

As aforesaid, in accordance with a preferred embodiment of this invention, the flexible polymer applied to the surface of the cellular polyurethane sheet does not also serve as the finish coating and the flexible polymer is applied prior to the needling operation. In this embodiment, the flexible polymer coating is relatively very thin, e.g. about 1 to 2 mils. Preferably, it will be a polyurethane polymer and most preferably a polyester polyurethane. This thin coating of flexible polymer is applied to the surface of the cellular polyurethane sheet and cured, if necessary. The fibrous mat is then placed on the opposite side of the cellular polyurethane sheet and fibers are physically forced into the cellular sheet and preferably through the sheet and through the flexible polymer coating. The resultant fiber-foam substrate is then compressed as hereinbefore described. When the fibers are forced through the flexible polymer coating the bond between the fibers and the coating is increased and the coating is made more porous. Similar techniques may be employed with two-layer cellular polyurethane sheets wherein the flexible polymer is applied to the surface of the second layer.

Other modifications may be made in the preparation of the novel compositions of this invention. For example, fibrous mats may be applied to both sides of the cellular polyurethane and needling may also be done from both sides. In this embodiment, the fibers of each mat are bonded to the substrate by means of the entanglement of the fibers of one mat with the fibers of the other mat in the body of the cellular polyurethane sheet. The flexible polymer coating may be applied to only one side of these doubly needled sheets or to both sides.

The novel sheet compositions of this invention are highly suitable for use as leather substitutes. They may be finished with finish coatings on one or both surfaces. They may be laminated with themselves or with other suitable compositions.

The product of the invention may be treated with any of the usual agents used as finish coats with natural leather to improve appearance or extend durability. Any of the various leather coatings may be used. Various natural or synthetic resin coatings, especially acrylic resins or proteinaceous substances may be applied in accordance with standard practices to improve feel and appearance. A tie-coat, such as a copolymer of polyvinyl chloride-maleic anhydride may be employed to improve the bond between the flexible polymer coating and the finish coat. Preferably, any finish coat employed will be porous so that it does not detract from the breathability of the products of this invention. Breathability, however, is not essential for all of the various applications for which the supple sheet compositions of this invention are useful.

Practice of certain, specific embodiments of this invention are illustrated by the following examples:

EXAMPLES 1–23

These examples illustrate practice of embodiments of the invention wherein the cellular polyurethane comprises two layers, the second layer being coated with flexible polymer prior to needling, and the needling being accomplished in two separate steps.

The compositions employed are shown in Table I below. In each of the examples, the second cellular polyurethane layer was the polyester polyurethane described as "A" and having a 2 mil coating of flexible polyester polyurethane prepared by the reaction of an ethylene propylene adipate polyester with toluene diisocyanate and having a cured tensile strength of about 5000 p.s.i. and ultimate elongation of about 800%.

The first layers of the cellular polyurethane sheet are identified in Table I by the letters A–F. These materials are described as follows:

A. A polyester polyurethane foam having a density of about 1.8 pounds per cubic foot, a tensile strength of 19.4 p.s.i., an ultimate elongation of 312% and a tear strength of 4.18 pounds per inch.
B. A high silicone content polyether polyurethane foam having a density of 1.65 pounds per cubic foot, a tensile strength of 15.5 pounds per square inch, an ultimate elongation of 275%, a tear strength of 2.33 pounds per inch, a compression measured on a two inch sample of 19.5 p.s.i. at 25% deflection, 24.8 p.s.i. at 50% deflection, and 33 p.s.i. at 65% deflection, the 65/35 modulus being 1.69.
C. A polyether polyurethane foam having a density of 2.46 pounds per cubic foot and a compression of 15.6 p.s.i. at 25% deflection, measured on a 2-inch sample.
D. A polyether polyurethane foam having a density of 2.4 pounds per cubic foot, a tensile strength of 8.5 p.s.i., an ultimate elongation of 205%, a tear strength of 1.4 pounds per inch, a compression of 18 p.s.i. (measured on a two inch sample) at 25% deflection, 25.5 p.s.i. at 50% deflection and 37.5 p.s.i. at 65% deflection, the 65/25 modulus being 2.
E. A polyether polyurethane foam having a density of 1.5 pounds per cubic foot, a tensile strength of 14.5 p.s.i., an ultimate elongation of 215%, a tear strength of 2 pounds per inch, a compression (measured on a two inch sample) of 22.0 p.s.i. at 25% deflection, 29.5 p.s.i. at 50% deflection and 41.0 p.s.i. at 65% deflection, the 65/25 modulus being 1.8.
F. A polyester polyurethane foam having a density of 4.63 pounds per cubic foot, a tensile strength of 35 p.s.i., an ultimate elongation of 312% and a tear strength of 3.35 pounds per inch.

The components used in each of Examples 1–13 are shown in Table I.

TABLE I

| Example No. | Fibrous Mat | First layer of sheet Type | First layer of sheet Thickness (inches) | Second layer of sheet Thickness (inches) |
|---|---|---|---|---|
| 1 | 9 oz., 3 denier crosslaid polyethylene terephthalate web. | A | 1/4 | 1/4 |
| 2 | do. | A | 3/8 | 1/4 |
| 3 | 2-ply, 4.5 oz., 3 denier polyethylene terephthalate web. | A | 3/8 | 1/4 |
| 4 | 9 oz., 3 denier, airlaid nylon web. | A | 3/8 | 1/4 |
| 5 | do. | A | 3/8 | 1/8 |
| 6 | do. | B | 3/8 | 1/4 |
| 7 | do. | C | 3/8 | 1/4 |
| 8 | do. | D | 3/8 | 1/4 |
| 9 | do. | E | 3/8 | 1/4 |
| 10 | do. | F | 3/8 | 1/4 |
| 11 | do. | F | 1/4 | 1/4 |
| 12 | do. | F | 1/4 | 1/4 |
| 13 | 9 oz., 3 denier, crosslaid nylon web. | A | 3/8 | 1/4 |

In each example, the fibrous mat was placed on the first layer of cellular polyurethane and this composite was passed 8 times through a laboratory-size needle loom having 40-gauge "no kick-up" barb needles, set for a penetration depth of 2 15/16 inches. The penetration density was 1800 penetrations per square inch.

This was placed upon the second layer of cellular polyurethane with the fibrous mat side of the first layer away from the second layer. This composition was needled from the fibrous mat side by passing it 6 times through the same needle loom for a penetration density of 1350 penetrations per square nich.

After the second needling step, the integrated fiber-foam substrates were compressed for 5 minutes at 300° F. and a pressure of 300 p.s.i.

The compressed substrates were then coated with a variety of finish coatings such as patent leather finishes. Textured finishes were also applied.. The finish coatings generally had a thickness between about 2.5 mils and 7 mils.

After finishing, the products of Examples 1–13 had the appearance of leather. They were judged to have excellent hand, drape, break, temper and flexibility, closely approximating those of natural leather.

EXAMPLE 14

A 0.375 inch layer of the foam identified as "A" in Examples 1–13 is coated on one side with a 2 mil coating of an ethylene propylene adipate—MDI polyurethane elastomer having a tensile strength of about 5000 pounds per square inch and an ultimate elongation of about 800%. A layer of 4.5 ounce per square yard non-woven polyethylene terephthalate web having an individual fiber diameter of 3 denier is placed on the opposite side of the foam and needled with 40-gauge, "no kick-up" barb needles to a penetration density of 1125 penetrations per square inch. A second layer of the polyethylene terephthalate nonwoven web is placed on top of the first and the combination is again needled to a density of 1125 penetrations per square inch.

The needled substrate is then compressed under the conditions of Examples 1–13. The resulting compressed, supple sheet composition is coated with a vinyl chloride plastisol coating to give the appearance of a leather upholstery material.

EXAMPLES 15–17

In these examples the cellular polyurethane sheet employed is a 0.5 inch sheet of the foam identified as "A" in Examples 1–13. In each case, the fibrous mat identified in Table II as "First Fibrous Mat," is needled into one side of the foam sheet at a penetration density of 1800 penetrations per square inch. The fibrous mat identified as "Second Fibrous Mat" was placed on the opposite side of the sheet and needled into the composite at a penetration density of 1350 penetrations per square inch.

TABLE II

| Example 4 | First fibrous mat | Second fibrous mat |
| --- | --- | --- |
| 15 | 4.5 oz., 3 denier, 2-ply polyethylene terephthalate web. | 4.5 oz., 3 denier, 1-ply, supercrimped, air-laid, nylon web. |
| 16 | 4.5 oz., 3 denier, 1-ply polyethylene terephthalate web plus 4.5 oz., 3 denier, 1-ply nylon web (nylon to outside). | 4.5 oz., 3 denier, 1-ply, polyethylene terephthalate web plus 4.5 oz., 3 denier nylon web (nylon to outside). |
| 17 | do | Do. |

The product of Example 17 is coated with a 2 mil coating of an ethylene propylene adipate—MDI polyurethane having a tensile strength of about 5000 pounds per square inch and an ultimate elongation of about 800%. Each of the needled substrates is then compressed for about 5 minutes at 30 p.s.i. and 300° F. Each compressed substrate is then coated with a 2 mil coating of the ethylene propylene adipate—MDI polyurethane. The products have a leather-like hand and accommodation and are suitable for use as a handbag leather.

EXAMPLE 18

On a 0.375 inch thick sheet of the cellular polyurethane "A" of Examples 1–13, there is placed a 2-ply, 4.5 ounce per square yard, 3 denier nylon nonwoven web which is needled into the foam at a penetration density of 1350 penetrations per square inch and a penetration depth sufficient to take the penetrating fibers just flush with the opposite surface of the foam. A 2 mil coating of the previously described ethylene propylene adipate—MDI polyurethane is applied to the surface of the foam opposite to the fibrous mat.

A 3 ounce per square yard, 3 denier, web of polyvinyl alcohol "polyvinyl chloride fibers sold under the trademark. "Envilon" and available from the Nichols Company of Boston, Mass. is placed on top of the nylon mat and needled through the foam and the coating to a penetration density of 1800 penetrations per square inch. The composite material is compressed for 5 minutes at 300 p.s.i. and 300° F. to give a permanently compressed, supple sheet composition having outstanding strength and integrity. Separate portions of the compressed sheet are finished by the application of acrylic and vinyl polymer coatings.

Although this invention has been described by reference to specific illustrative embodiments, it is not limited thereto but encompasses all modifications and variations thereof which fall within the general scope of the invention.

What is claimed is:

1. A process of preparing supple sheets which comprises the steps of preforming a flexible uncompressed cellular polyurethane sheet having a density from about 0.8–6 lbs./cubic foot and a thickness from about ½–2 inches; placing a fibrous mat comprised of synthetic or natural organic fibers or mixtures thereof having a density of about 3–24 oz./sq. yard adjacent at least one side of said sheet; needling a plurality of the fibers in said fibrous mat into said sheet at a density of from about 500–5000 penetrations/sq. inch, the degree of penetration being such that at least about 50% of the penetrating fibers penetrate at least about 50% of the thickness of the polyurethane sheet thereby forming an integrated fiber-foam substrate; compressing said fiber-foam substrate at an elevated temperature and pressuure sufficient to effect permanent compression.

2. A process as in claim 1 wherein the density of the fibrous mat is from about 3–6 oz./sq. yard and the denier of the fibers in the fibrous mat is from about 0.5–3.

3. A process as in claim 1 wherein the density of the fibrous mat is from about 6–24 oz./sq. yard and the denier of the fibers in the fibrous mat is from about 3–6.

4. A process as in claim 1 wherein the polyurethane sheet is a polyester or a polyether polyurethane.

5. A process as in claim 1 wherein the thickness of the permanently compressed fiber-foam substrate is from about 0.02–0.1 inch and the density is from about 15–100 lbs./cubic foot.

References Cited

UNITED STATES PATENTS 3,477,898   11/1969   Buff et al. _____ 161—160

OTHER REFERENCES

Doherty, JPOS, vol. 54, No. 9, September 1972, pp. 583–611.

HOSEA E. TAYLOR, Primary Examiner

H. S. COCKERAM, Assistant Examiner

U.S. Cl. X.R.

28—72.2 R; 156—148; 161—165; 264—45, DIG. 77